United States Patent
Iijima et al.

(10) Patent No.: US 6,970,431 B1
(45) Date of Patent: Nov. 29, 2005

(54) ELECTRONIC DEVICE, DATA COMMUNICATION METHOD AND DATA PROCESSING METHOD FOR ELECTRONIC DEVICE

(75) Inventors: Yuko Iijima, Kanagawa (JP); Eiji Tadokoro, Chiba (JP); Hiraku Inoue, Kanagawa (JP)

(73) Assignee: Sony Corporation, Tokyo (JP)

( * ) Notice: Subject to any disclaimer, the term of this patent is extended or adjusted under 35 U.S.C. 154(b) by 841 days.

(21) Appl. No.: 09/763,012

(22) PCT Filed: Jun. 12, 2000

(86) PCT No.: PCT/JP00/03793

§ 371 (c)(1), (2), (4) Date: Feb. 15, 2001

(87) PCT Pub. No.: WO00/79736

PCT Pub. Date: Dec. 28, 2000

(51) Int. Cl.⁷ ............................................. H04L 12/28
(52) U.S. Cl. ..................................... 370/254; 370/242
(58) Field of Search ............................. 370/254, 248, 370/318, 360, 384, 389, 395.5, 399, 468, 370/474, 255, 257, 241, 242, 246, 247, 249, 370/251, 244, 245, 250, 252; 709/217; 705/57; 382/184

(56) References Cited

U.S. PATENT DOCUMENTS

| | | | |
|---|---|---|---|
| 5,668,800 A | * | 9/1997 | Stevenson .................. 370/248 |
| 5,751,707 A | * | 5/1998 | Voit et al. ................... 370/384 |
| 6,157,972 A | * | 12/2000 | Newman et al. ............. 710/100 |
| 6,188,678 B1 | * | 2/2001 | Prescott ...................... 370/318 |
| 6,307,974 B1 | * | 10/2001 | Tsujimoto ................... 382/239 |
| 6,327,637 B1 | * | 12/2001 | Chang ........................ 710/305 |
| 6,587,904 B1 | * | 7/2003 | Hauck et al. ............... 710/107 |
| 6,603,740 B1 | * | 8/2003 | Du ............................. 370/248 |
| 6,654,353 B1 | * | 11/2003 | Tokura et al. .............. 370/254 |
| 6,731,650 B1 | * | 5/2004 | Yamagishi ................... 370/468 |
| 6,842,805 B1 | * | 1/2005 | Hauck et al. ............... 710/104 |
| 2001/0012383 A1 | * | 8/2001 | Kawai ........................ 382/114 |
| 2003/0063601 A1 | * | 4/2003 | Niida et al. ................. 370/360 |

FOREIGN PATENT DOCUMENTS

JP        2000244546 A  *  9/2000    ........... H04L 12/44

* cited by examiner

Primary Examiner—Phirin Sam
(74) Attorney, Agent, or Firm—Jay H. Maioli

(57) ABSTRACT

When an interruption of a bus reset occurs in accordance with the IEEE1394 standard at the time of turn-on of a power source or the like, whether a loop connection has been made or not is discriminated. If it is determined that the loop connection has been made, "i.LINK NG" or "i.LINK LOOP" as a warning display showing that the loop connection has been made is displayed. By displaying such a warning, the user or the like can recognize the fact that the loop connection has been made. A measure for cancelling the loop connection can be performed. If it is determined that the loop connection is not performed, such a warning display is not performed but the ordinary operation according to the IEEE1394 standard is performed.

8 Claims, 6 Drawing Sheets

ELECTRONIC DEVICE, DATA COMMUNICATION METHOD AND DATA PROCESSING METHOD FOR ELECTRONIC DEVICE

TECHNICAL FIELD

The invention relates to an electronic apparatus, a data communicating method, and a data processing method for an electronic apparatus. More particularly, the invention relates to an electronic apparatus, a data communicating method, and a data processing method for an electronic apparatus, in which transmission and reception of data are performed through a digital communication bus.

BACKGROUND ART

In recent years, as an interface for multimedia data transfer, IEEE (The Institute of Electronical and Electrical Engineers) 1394, High Performance Serial Bus, for realizing a high speed data transfer and a real-time transfer has been standardized.

According to the IEEE1394 standard, for example, a plurality (up to 63) of application side circuits such as MPEG (Moving Picture Expert Group) transporters or the like can be connected to the IEEE1394 serial bus. A connecting format of the IEEE1394 serial bus has been specified so as to have a node branch, namely, what is called a tree shape. A circuit serving as a branch point, namely, a node of the tree-shaped connecting format is a physical layer circuit in each IEEE1394 serial interface.

According to the IEEE1394 standard, the insertion or ejection of a bus cable to/from a port can be performed in a hot state, namely, in a state where a power source is turned on and an apparatus is operating. A bus reset is generated at a point when the node is added or deleted by the insertion or ejection of the bus cable to/from the port and a parent/child relation between the nodes is determined.

In the case where the cable is connected in a loop shape such as a case where the user erroneously connects or the like, the parent/child relation cannot be determined and the data cannot be transferred.

It will be, therefore, convenience if there is a function such that in the case where the cable is connected in a loop shape, the user is notified of such a fact through a display unit of each electronic apparatus as an application side circuit. However, an electronic apparatus having such a function does not exist yet.

DISCLOSURE OF INVENTION

It is, therefore, an object of the invention to provide an electronic apparatus having such a function that in the case where a cable is connected in a loop shape, the user is notified of such a fact through a display unit of each electronic apparatus as an application side circuit and to provide a data communicating method and a data processing method for such an electronic apparatus.

To solve the above problem, according to the invention, there is provided an electronic apparatus which is connected to another apparatus by a digital communication bus and performs transmission and reception of data via the digital communication bus, comprising: a display unit; and a control unit for controlling the operation of the display unit, wherein the control unit detects whether another apparatus and the digital communication bus are connected so as to form a loop or not, and when a detection result indicates that they are connected so as to form the loop, the display unit is allowed to perform a warning display.

According to the invention, there is provided a data communicating method of connecting a plurality of electronic apparatuses by a digital communication bus and performing transmission and reception of data via the digital communication bus, comprising the steps of: detecting whether another electronic apparatus of the plurality of electronic apparatuses and the digital communication bus are connected so as to form a loop or not in at least one of the plurality of electronic apparatuses; and when it is detected that the digital communication bus is connected to another apparatus so as to form the loop, performing a warning display.

According to the invention, there is provided an electronic apparatus which is connected to another apparatus by a digital communication bus and performs transmission and reception of data via the digital communication bus, comprising a control unit for controlling the operation of the apparatus, wherein the control unit detects whether another apparatus and the digital communication bus are connected so as to form a loop or not and generates a control signal for performing a warning display when a detection result indicates that they are connected so as to form the loop.

According to the invention, there is provided a data processing method for an electronic apparatus which is connected to another apparatus by a digital communication bus and performs transmission and reception of data via the digital communication bus, wherein a control unit detects whether another apparatus and the digital communication bus are connected so as to form a loop or not and generates a control signal for performing a warning display when a detection result indicates that they are connected so as to form the loop.

As mentioned above, according to the invention, the control unit detects whether another apparatus and the digital communication bus are connected so as to form the loop or not and generates the control signal for performing a warning display when a detection result indicates that they are connected so as to form the loop. Therefore, for example, the fact that a cable of a bus such as an IEEE1394 serial bus or the like has been connected in a loop shape can be accurately displayed.

BEST MODE FOR CARRYING OUT THE INVENTION

Prior to describing an embodiment of the invention, the IEEE1394 standard will be first explained for easy understanding. As a data transfer via the IEEE1394 interface, there are a conventional asynchronous transfer for performing a request and a reception confirmation such as Request and Acknowledge and an isochronous transfer in which data is certainly transmitted from a certain node once every 125 μsec. In the IEEE1394 interface, the data transfer is performed on a packet unit basis. In the IEEE1394 interface, a unit of minimum data to be handled is one quadlet (=4 bytes=32 bits).

Figure 1:
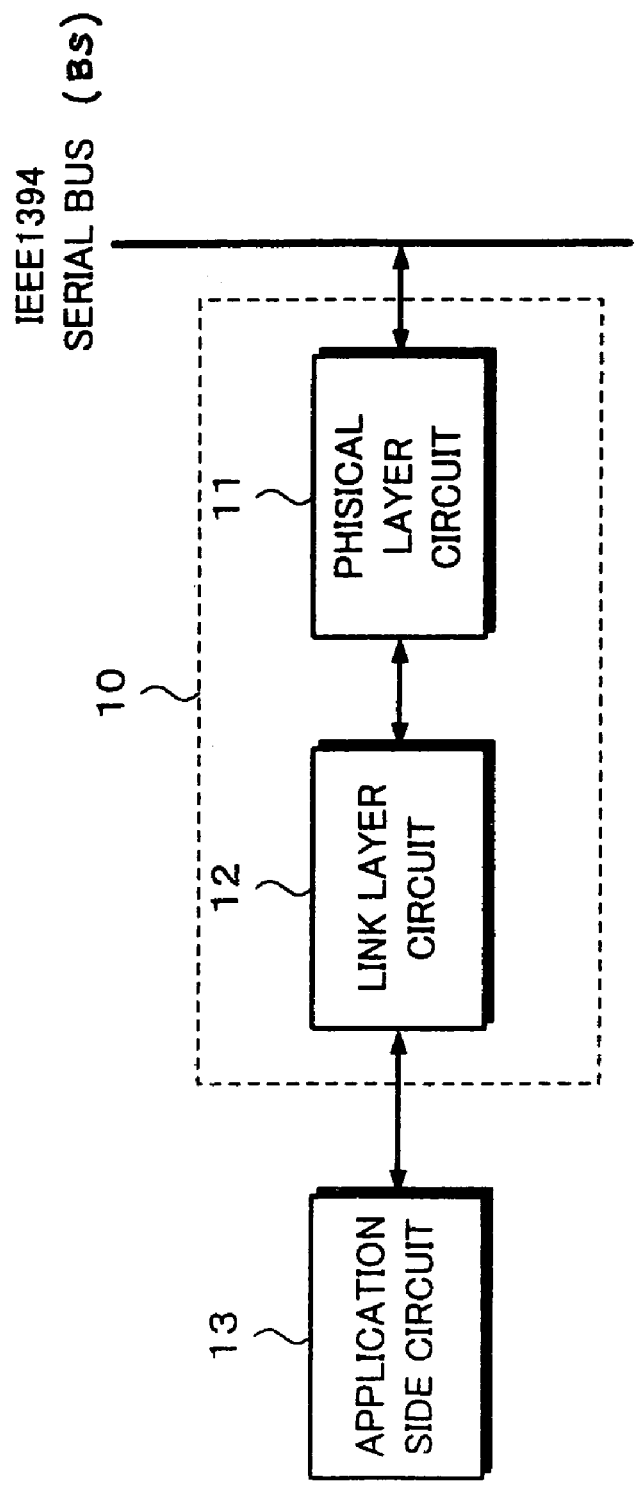
FIG. 1 is a block diagram showing an example of a fundamental construction of an isochronous communication system circuit in an IEEE1394 serial interface bus.

Such an IEEE1394 serial interface for performing the transmission and reception of a packet will be described with reference to FIG. 1. A signal processing circuit 10 of the IEEE1394 serial interface (hereinafter, referred to as a signal processing circuit 10) has: a physical layer circuit 11 for directly driving an IEEE1394 serial bus; and a link layer circuit 12 for controlling a data transfer of the physical layer circuit 1. The physical layer circuit 11 is connected to a serial interface bus BS through a port. For example, an application side circuit 13 such as an MPEG transporter or the like is connected to the link layer circuit 12.

In the IEEE1394 standard, it is assumed that up to 63 signal processing circuits 10 can be connected through the serial interface bus BS. A connecting format of the serial interface bus BS has been specified so as to have a node branch, namely, what is called a tree shape. A circuit serving as a branch point, namely, a node of the tree-shaped connecting format is the physical layer circuit 11 in the signal processing circuit 10. One or a plurality of ports can be provided for the physical layer circuit 11. The serial interface bus BS is connected to each of the ports.

According to the IEEE1394 standard, the insertion or ejection of a bus cable to/from the port can be performed in a hot state, namely, in a state where a power source is turned on and each electronic apparatus as each application side circuit 13 is operating. A bus reset is generated at a point when the node is added or deleted by the insertion or ejection of the bus cable to/from the port and a parent/child relation between the nodes is determined.

Figure 2:
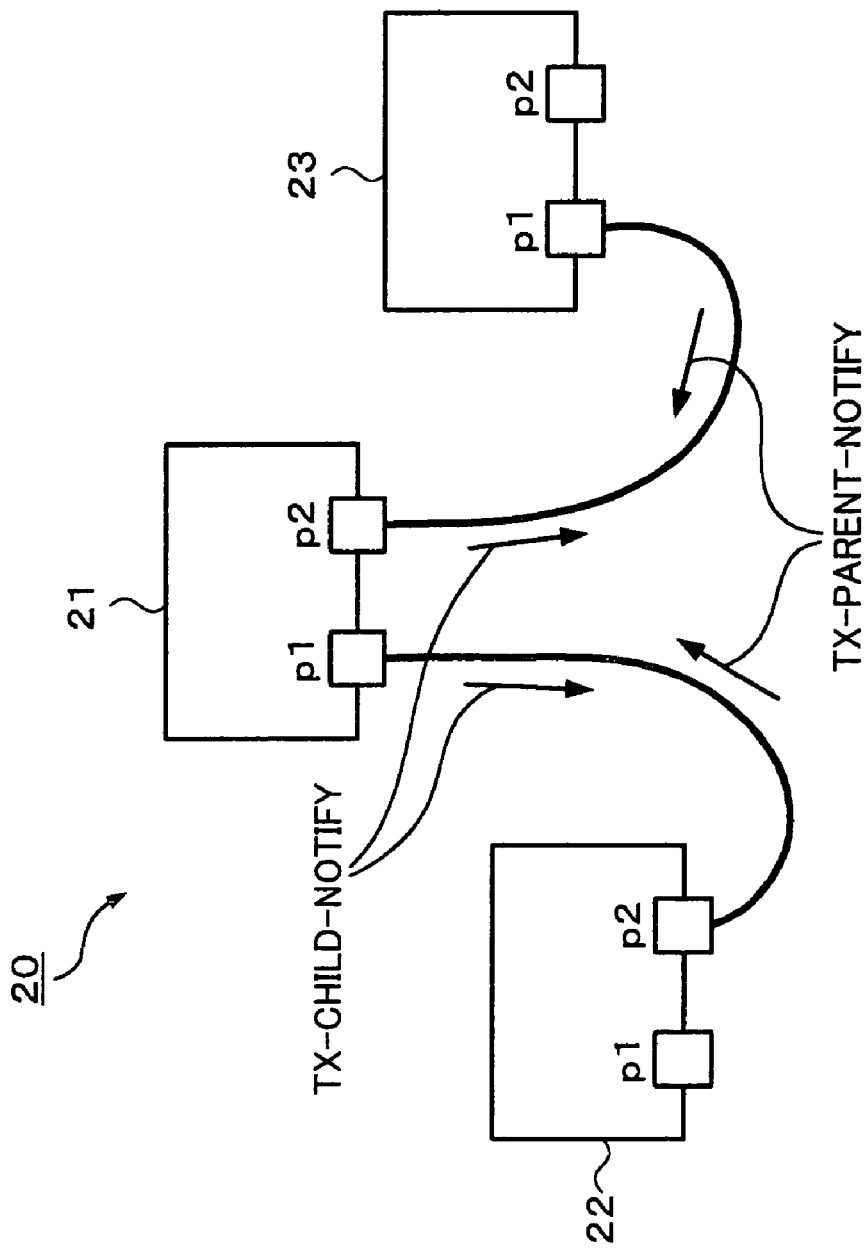
FIG. 2 is a block diagram showing an example of a construction of a system in which a plurality of electronic apparatuses are connected by using the IEEE1394 serial interface bus.

FIG. 2 shows an example of a system in which three nodes are connected in a tree shape by using the IEEE1394 serial bus cable. The cable of the IEEE1394 serial bus is shown by a bold line. Such a system 20 has nodes 21, 22, and 23 as physical layer circuits constructing the signal processes of the IEEE1394 serial interface. Two ports p1 and p2 are provided for each of the nodes 21, 22, and 23. Each of the nodes 21, 22, and 23 has a register showing an operating mode of the node and a register showing an operating mode of each port. In this example, the port p2 of the node 22 is connected to the port p1 of the node 21 and the port p1 of the node 23 is connected to the port p2 of the node 21.

The node 21 recognizes the fact that the nodes 22 and 23 are the child nodes in response to requests from the nodes 22 and 23 and, thereafter, transmits a signal "TX_CHILD_NOTIFY" to the nodes 22 and 23. Thus, a connecting relation such that the node 21 is a parent and the nodes 22 and 23 are children is satisfied. In dependence on a connection timing of the bus cable, there is also a case where the node 21 transmits a request signal "TX_PARENT_NOTIFY" to the node 22 or 23 and the node 22 or 23 becomes the parent node.

However, when considering a case where the port p1 of the node 22 and the port p2 of the node 23 are further connected in the construction shown in FIG. 2, in this case, the nodes 21, 22, and 23 transmit the request signal "TX_PARENT_NOTIFY". Thus, the parent/child relation cannot be determined among the nodes 21, 22, and 23 and the transmission and reception of the packet are impossible. As mentioned above, if a part of the system shown in FIG. 2 is connected in a loop shape by the loop connection, namely, by connecting a certain node and another certain node by the cable of the IEEE1394 serial bus, the transmission and reception of the packet are impossible. The operation according to the IEEE1394 standard cannot be performed.

Figure 3:
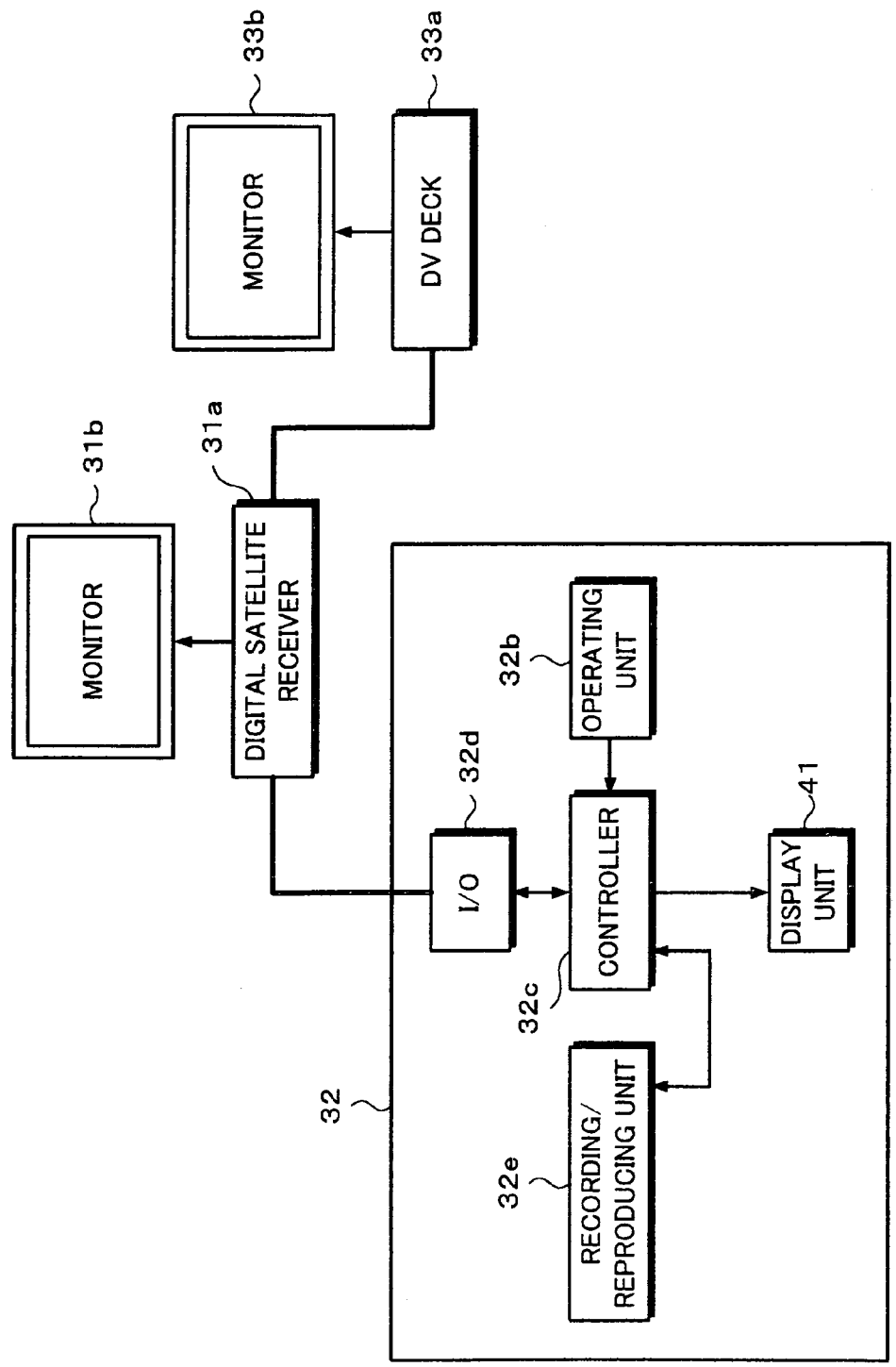
FIG. 3 is a block diagram showing a specific example of the system in which a plurality of electronic apparatuses are connected by using the IEEE1394 serial interface bus.

An embodiment of the invention will now be described hereinbelow. FIG. 3 shows a specific example of the system in which a plurality of electronic apparatuses are connected by using the IEEE1394 serial bus. In this example, a digital satellite receiver 31a, an optical disc recording and/or reproducing apparatus (hereinafter, simply referred to as an optical disc drive apparatus) 32, and a DV (Digital Video) deck 33a are connected by the IEEE1394 serial bus. The cable of the IEEE1394 serial bus is shown by a bold line.

The optical disc drive apparatus 32 records/reproduces data such as audio data or the like by using a recordable magnetooptic disk or a read only optical disc. The optical disc drive apparatus 32 has, for example, an I/O unit 32d, a controller 32c, an operating unit 32b, a recording/reproducing unit 32e, and a display unit 41. The controller 32c comprises a microprocessor, a memory, or the like and controls the whole optical disc drive apparatus 32 in accordance with a program which has previously been stored in the memory. The I/O unit 32d is an interface corresponding to the IEEE1394 serial bus. The transmission and reception of the data between the optical disc drive apparatus 32 and an external apparatus via the IEEE1394 serial bus are performed via the I/O unit 32d on the basis of a control of the controller 32c. A plurality of IEEE1394 serial buses can be connected to the I/O unit 32d.

The operating unit 32b has one or a plurality of switching devices, dial devices, and the like. When a predetermined operation is performed to the switching devices, dial devices, or the like by the user, the operating unit 32b generates a control signal based on the operation. The control signal is supplied to the controller 32c. The display unit 41 comprises, for example, an LCD (Liquid Crystal Display) and its display is controlled by a display control signal which is supplied from the controller 32c.

The recording/reproducing unit 32e comprises: a driving unit for actually performing the recording of data to a recordable magnetooptic disk or the reproduction of data from a recordable magnetooptic disk or a read only optical disc; and a data processing unit for performing data processes necessary for recording or reproduction. On the basis of the control of the controller 32c, the recording/reproducing unit 32e performs the recording of data to the recordable magnetooptic disk or the reproduction of data from the recordable magnetooptic disk or read only optical disc.

For example, the audio data inputted from the outside to the I/O unit 32d is supplied to the recording/reproducing unit 32e via the controller 32c. The audio data is recorded onto the recordable magnetooptic disk loaded in a predetermined place of the recording/reproducing unit 32e by the control of the controller 32c in accordance with the operation by the user to the operating unit 32b. The audio data is reproduced from, for example, the read only optical disc loaded in the predetermined place of the recording/reproducing unit 32e. The reproduced audio data is supplied to the I/O unit 32d through the controller 32c and outputted to the outside.

Figure 5:
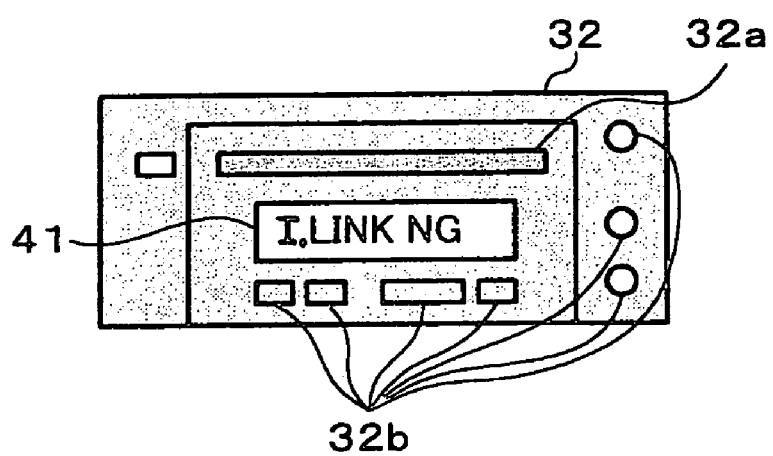
FIG. 5 is a schematic diagram showing an example of a display according to the invention.

For example, as shown in FIG. 5, the optical disc drive apparatus 32 has: an inserting/ejecting port 32a for inserting or ejecting a disc into/from an operation panel on the front side of the apparatus 32; a plurality of operating switches 32b for switching the operation of the apparatus 32; and the display unit 41. The DV deck 33a records or reproduces a digital video signal to/from a video tape. As for each of the digital satellite receiver 31a, optical disc drive apparatus 32, and DV deck 33a, as a connector for connecting a connecting cable for IEEE1394, a plurality of ports are provided in a lower portion or the like on the rear side or front side of each apparatus. Monitors 31b and 33b are connected to the digital satellite receiver 31a and DV deck 33a in order to display at least a reproduced video signal, respectively.

Figure 4:
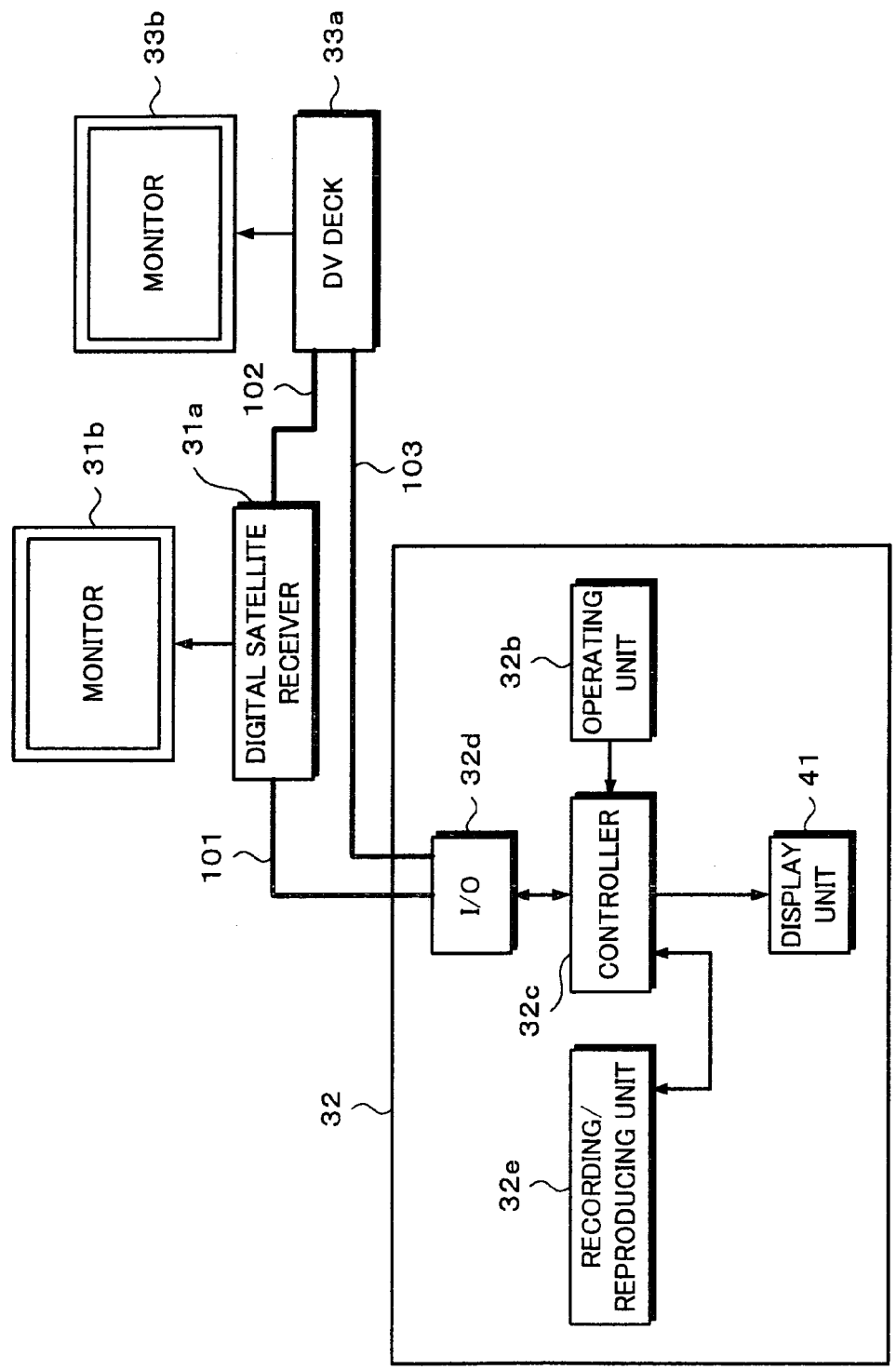
FIG. 4 is a block diagram for explaining the case where nodes are connected so as to form a loop.

FIG. 4 shows a case where the optical disc drive apparatus 32 and DV deck 33a are further connected by using an IEEE1394 serial interface bus 103 in the system construction shown in FIG. 3. In this case, since the connecting cable for IEEE1394 is loop connected as shown in the diagram, as mentioned above, the parent/child relation based on "TX_PARENT_NOTIFY" cannot be determined among the digital satellite receiver 31a, optical disc drive apparatus 32, and DV deck 33a, the tree structure cannot be decided, and a nodeID cannot be numbered. Therefore, a function as a bus cannot be performed, for example, packet transmission and reception between desired electronic apparatuses cannot be performed, and the like. In this case, a normal function cannot be expected so long as a connection change to cancel the physical loop connection is not performed by the user or the like.

In many cases, it is actually difficult to recognize the fact that a plurality of electronic apparatuses are connected in a loop shape by the connecting cable for IEEE1394 by confirming the physical connection itself, namely, by confirming which apparatuses are erroneously wired or connected. Therefore, it will be convenient if there is a function for displaying the fact that they are loop connected to the user or the like. In case of the electronic apparatuses such that the information is outputted to the user through displays each having a relatively large display area such as monitors 31b and 33b or the like connected to the digital satellite receiver 31a and DV deck 33a in FIG. 4, it is sufficient to display that the cable connects the apparatuses so as to form a loop, for example, to display characters such as "Cable is loop connected" or the like through the monitors.

However, in a small electronic apparatus for consumers, a display area of a display unit is often small. In such an electronic apparatus, it is difficult to display a warning of a long sentence by using the monitor as mentioned above. In the invention, therefore, when it is detected that the bus (cable) connects the apparatuses so as to form a loop, a simple display consisting of the small number of characters using a keyword such as "i.LINK NG", i.LINK LOOP", "CABLE LOOP", or the like is performed in the display unit. As mentioned above, "i.LINK" is a trademark showing the IEEE1394 serial bus.

Figure 6:
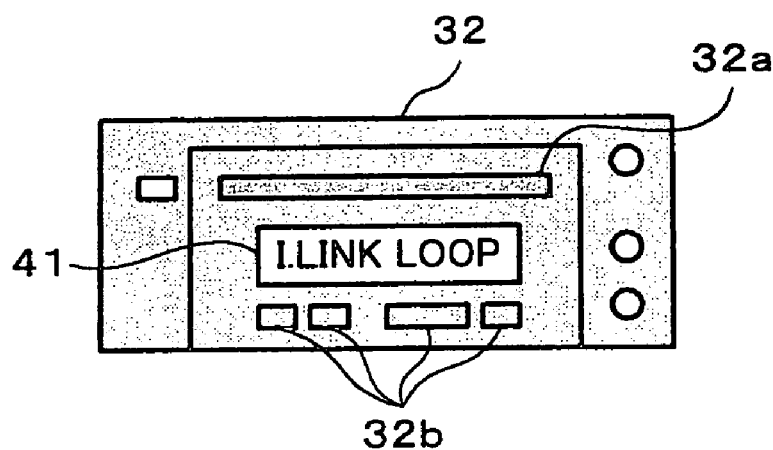
FIG. 6 is a schematic diagram showing another example of a display according to the invention.

FIG. 5 shows an example of a specific display. "i.LINK NG" is displayed as a warning display in the case where, the cable connects the apparatuses to, for example, the display unit 41 comprising an LCD or the like provided for an operation panel of the optical disc drive apparatus 32 so as to form a loop as shown in, for example, FIG. 4. FIG. 6 shows another example of a warning display which is displayed in the display unit 41. In the example shown in FIG. 6, "i.LINK LOOP" is displayed in the case where the cable is loop connected to, for example, the display unit 41 provided for the operation panel of the optical disc drive apparatus 32.

"i.LINK LOOP" has the larger number of characters than that of "i.LINK NG" and shows more detailed information. Therefore, it is considered to be preferable to display a warning "i.LINK NG" when the display area of the display unit provided for the electronic apparatus is small and to display a warning "i.LINK LOOP" if there is a surplus display area of the display unit.

Since the warning as mentioned above is displayed in the display unit of the electronic apparatus, the user or the like recognizes that the apparatuses, namely, the nodes are connected so as to form a loop, and a measure for cancelling the loop such that the connecting cable 103 in FIG. 4 is disconnected and the connection is returned to the state shown in FIG. 3, a connecting cable 101 or 102 is disconnected, or the like is performed by the user or the like, so that the normal operation according to the IEEE1394 standard is performed, and communication between the electronic apparatuses in the system is enabled.

When the optical disc drive apparatus 32 detects that the loop connection is cancelled as mentioned above, the warning display as shown in FIG. 5 or 6 is deleted from the display unit 41. Thus, the user or the like is notified of the fact that the state where the apparatuses are connected so as to form a loop has been cancelled.

Figure 7:
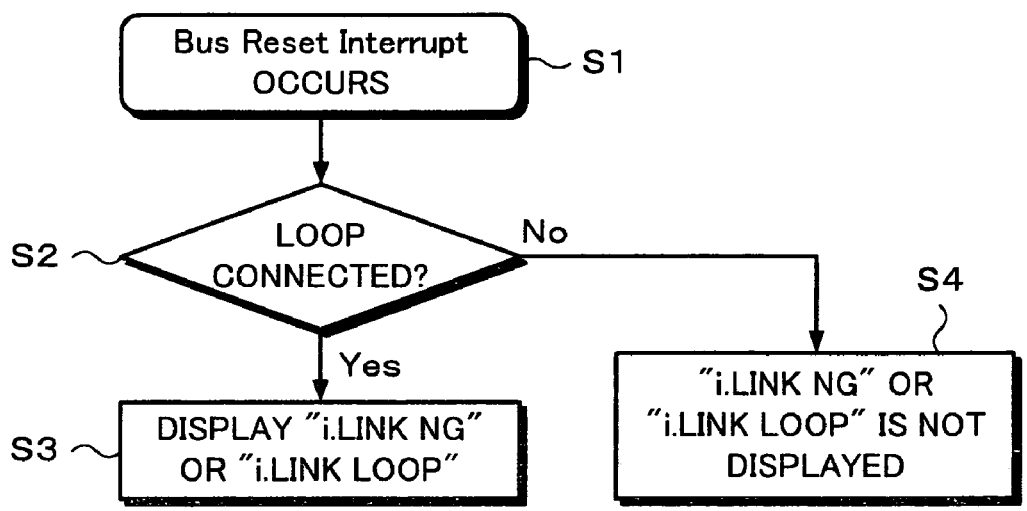
FIG. 7 is a flowchart for explaining processes in an embodiment of the invention.

Processes regarding the display in the case where the fact that the apparatuses, namely, the nodes have been connected so as to form a loop is detected in the optical disc drive apparatus 32 will be described with reference to FIG. 7. The processes in the flowchart of FIG. 7 are executed in the controller 32c mentioned above. In step S1, an interruption of a bus reset occurs in accordance with the IEEE1394 standard when the power source is turned on, when a new node is connected to the bus, or the like. After the bus reset, usually, the process such as setting of the parent/child relation between the nodes in the system based on "TX_PARENT_NOTIFY" or the like is executed as mentioned above. In the embodiment of the invention, the processing routine advances to step S2 subsequently to step S1.

In step S2, the controller 32c of the optical disc drive apparatus 32 detects whether the process which is executed after the bus reset such as setting of the parent/child relation between the nodes based on, for example, "TX_PARENT_NOTIFY" mentioned above or the like has been finished within a predetermined time or not, thereby discriminating whether the nodes have been connected so as to form a loop or not.

If it is determined that the nodes are connected so as to form a loop, step S3 follows. In the other case, step S4 follows. If it is determined in step S2 that the processes are not finished within the predetermined time but the nodes are connected so as to form a loop, a warning of "i.LINK NG" or "i.LINK LOOP" is displayed in the display unit 41 in response to the control signal from the controller 32c of the apparatus 32 in step S3.

That is, if it is determined in step S2 that the processes are not finished within the predetermined time but the nodes are formed so as to form a loop, the display control signal to perform the warning display as mentioned above is generated by the controller 32c. The display control signal is supplied to the display unit 41 and the warning as shown in FIG. 5 or 6 mentioned above is displayed in the display unit 41 on the basis of the supplied display control signal.

If it is determined in step S2 that the processes which are executed after the bus reset are finished within the predetermined time but the nodes are not connected so as to form a loop, step S4 follows. The warning such as "i.LINK NG", "i.LINK LOOP", or the like is not displayed in the display unit 41 but the ordinary operation such as setting of the parent/child relation between the nodes or the like according to the IEEE1394 standard is performed.

The foregoing embodiment of the invention has been described by using the optical disc drive apparatus 32 as an example of the electronic apparatus in which the display area of the display unit is small or an enough display area cannot be assured. On the other hand, the invention can be also applied to an electronic apparatus which is connected to, for example, the digital satellite receiver 31a, DV deck 33a, or the like in FIG. 2 and uses a relatively large monitor for the optical disc drive apparatus 32.

Besides the case of performing the foregoing warning display to the display unit of a small display area provided for the operation panel or the like of one of the plurality of electronic apparatuses constructing the system of FIG. 2, for example, if the foregoing warning display is performed to each of the display units of the plurality or all of the electronic apparatuses constructing the system, the user or the like can more easily and certainly recognize the loop connection.

The embodiment of the invention mentioned above is obtained by applying the invention to the system in which a plurality of electronic apparatuses are connected by the IEEE1394 serial bus. On the other hand, the invention can be applied also to a system using another kind of bus. It is necessary to use a display character train according to the kind of bus.

The invention is not limited to the embodiment of the invention mentioned above but many modifications and variations are possible within the scope of the invention without departing from the spirit thereof.

What is claimed is:

1. An electronic apparatus which is connected to another apparatus via an IEEE 1394 bus and performs transmission and reception of data through said IEEE 1394 bus, comprising:
   a display unit; and
   a control unit for controlling the operation of said display unit, wherein
   said control unit detects whether said another apparatus and said digital communication bus are connected so as to form a loop or not, and
   when a result of said detection indicates that they are connected so as to form said loop, said control unit controls said display unit to display a warning message related to said loop connection, and
   said control unit detects whether they are connected so as to form the loop or not by discriminating whether processes which are executed after a bus reset was generated have been finished within a predetermined period or not.

2. The electronic apparatus according to claim 1, wherein each apparatus includes at least two bus ports.

3. The electronic apparatus according to claim 2, wherein when the processes which are executed after the bus reset was generated are not finished within the predetermined period, said control unit detects that they are connected so as to form said loop and controls said display unit to display said warning message.

4. The electronic apparatus according to claim 2, wherein when the processes which are executed after the bus reset was generated are finished within the predetermined period, said control unit detects that they are not connected so as to form said loop and does not control said display unit to display said display message.

5. A data communicating method whereby a plurality of electronic apparatuses are connected via a IEEE 1394 bus and transmission and reception of data are performed through said IEEE 1394 bus, comprising the steps of:
   detecting whether another apparatus among said plurality of electronic apparatuses and said digital communication bus are connected so as to form a loop or not with at least one of said plurality of electronic apparatuses;
   when it is detected that said digital communication bus is connected to said another apparatus so as to form said loop, controlling a display unit to display a warning message related to said loop connection; and
   detecting whether they are connected so as to form the loop or not by discriminating whether processes which are executed after a bus reset was generated have been finished within a predetermined period or not.

6. The data communicating method according to claim 5, wherein each of said plurality of apparatuses includes at least two bus ports.

7. The data communicating method according to claim 6, wherein when the processes which are executed after the bus reset was generated are not finished within the predetermined period, it is detected that they are connected so as to form said loop and said display unit is controlled to display said warning message.

8. The data communicating method according to claim 6, wherein when the processes which are executed after the bus reset was generated are finished within the predetermined period, it is detected that they are not connected so as to form said loop and said display unit is controlled to not display said warning message.

* * * * *